(12) United States Patent
Rogger

(10) Patent No.: US 7,303,050 B2
(45) Date of Patent: Dec. 4, 2007

(54) FASTENING ELEMENT FOR ELEVATOR GUIDE RAILS

(75) Inventor: Martin Rogger, Rotkreuz (CH)

(73) Assignee: Inventio Ag, Hergiswil NW (CH)

( * ) Notice: Subject to any disclaimer, the term of this patent is extended or adjusted under 35 U.S.C. 154(b) by 140 days.

(21) Appl. No.: 10/874,045

(22) Filed: Jun. 22, 2004

(65) Prior Publication Data

US 2004/0262095 A1 Dec. 30, 2004

(30) Foreign Application Priority Data

Jun. 25, 2003 (EP) .................... 03405459

(51) Int. Cl.
*B66B 7/02* (2006.01)

(52) U.S. Cl. .............. 187/408; 187/406; 248/611; 248/636; 52/301; 52/710; 104/124; 104/127

(58) Field of Classification Search ........... 187/369, 187/406, 414, 408, 410, 404; 254/37, 632–638; 267/152, 153, 140.1–141, 632–638; 104/125, 104/127, 128; 248/629, 636, 669; B66B 7/06, B66B 7/02
See application file for complete search history.

(56) References Cited

U.S. PATENT DOCUMENTS

| | | | | |
|---|---|---|---|---|
| 2,116,042 A | * | 5/1938 | Siegfried | 248/635 |
| 2,138,176 A | * | 11/1938 | Keys | 248/613 |
| 2,149,902 A | | 3/1939 | Saurer | |
| 2,459,741 A | * | 1/1949 | Kubaugh | 267/140.2 |
| 2,496,770 A | | 2/1950 | Bennett | |
| 3,957,127 A | * | 5/1976 | Bouchard et al. | 248/599 |
| 5,215,382 A | * | 6/1993 | Kemeny | 384/36 |
| 5,551,661 A | * | 9/1996 | Bunker | 248/634 |

FOREIGN PATENT DOCUMENTS

| | | |
|---|---|---|
| CH | 618 779 | 2/1980 |
| FR | 590 823 | 6/1925 |

* cited by examiner

*Primary Examiner*—Gene O. Crawford
*Assistant Examiner*—Stefan Kruer
(74) *Attorney, Agent, or Firm*—Fraser Clemens Martin & Miller LLC; William J. Clemens

(57) ABSTRACT

A sound-damping and/or vibration-damping fastening element for elevator guide rails includes an anchor rail connected by a damping medium with a support rail. The anchor rail supports the elevator guide rail and is partially embedded in the damping medium. The anchor rail extends parallel to the longitudinal extent of the support rail and the anchor rail and the support rail are spaced apart by at least one slot filled by the damping medium.

12 Claims, 1 Drawing Sheet

FASTENING ELEMENT FOR ELEVATOR GUIDE RAILS

BACKGROUND OF THE INVENTION

The present invention relates to a fastening element for elevator guide rails, to a method of production thereof and to a method of mounting thereof.

Elevators with cars are moved in a shaft along guide rails.

Known sound-damping and vibration-damping fastening elements for guide rails are usually rubber buffers vulcanized in place between two metal plates, wherein the metal plates are provided with threaded pins or threaded holes according to the respective need. These fastening elements are a base of the guide rails. In order to enable a serial, displaceable mounting of several apparatus or components there has become known, in a development of these fastening elements, an anchor rail which is connected with a metallic support profile member by means of a rubber cushion which is vulcanized on.

The mode of construction of these commercially available fastening elements has the disadvantage that they are relatively expensive with respect to material and manufacture.

The requirement for sound insulation in modern dwellings requires that, for example, essential parts of the elevator installation, such as guide rails, doors, regulators, etc., are to be fastened in a sound-damping and vibration-damping manner, wherein for reasons of safety these components in the case of a fire should change their position only insubstantially. However, the known fastening elements mentioned in the foregoing cannot fulfil, or can only partly fulfil, this requirement.

Swiss Patent Specification CH 618779 discloses a sound-damping and vibration-damping fastening element, particularly for high-rise construction.

In this fastening element an anchor rail is connected by means of a damping medium with a support rail. So that, in the case of fire, the components fastened on the anchor rail cannot substantially change their position, the anchor rail is arranged within the support rail, which has a C-shaped cross-section, wherein the profile slots of the two rails are disposed opposite one another and the support rail is filled with the damping medium up to the height of the profile slot of the anchor rail. Provided in the space between the profile slots is a safety plate which is screw-connected with the anchor rail by means of a fastening bolt, which carries the components, and a nut. In order to avoid transmission of vibration between the anchor rail and the support rail, a play is provided between the safety plate and the inner surfaces, which are directly adjacent thereto, of the support rail.

The above-described fastening element exhibits disadvantages.

The fastening element described in the Patent Specification CH 618779 is restricted to an element which is fixed in place with mortar or concrete, thus integrated in a support element. Subsequent fitting of a fastening which is present is not possible. There is thus at the construction a component which has to be provided or prepared at an appropriate early stage. It can be fastened (for example, screwed) to an existing support element only with considerable effort.

The safety plate described in the Patent Specification CH 618779 also has disadvantages. Since a play is present between the support rail and the safety plate, the risk exists, in the case of action of a force seeking to compensate for this play, but unable to act against a damping medium, that the damping medium can detach from the support rail and the anchor rail and thus the component was destroyed or made functionally incapable. In essence, the solution described according to the Patent Specification CH 618779 can absorb only forces which compress the damping medium, but do not load it in tension or shear. Since the profile cross-section of a commercially usual anchor rail is limited and of relatively small area, the profile length has to be executed to be correspondingly long so that relatively high forces can be transmitted. According to this solution, for example, the profile length cannot be reduced to a minimum over the profile height.

SUMMARY OF THE INVENTION

It is an object of the present invention to propose a sound-damping and vibration-damping fastening element for elevator guide rails which does not have these above-described disadvantages.

It is a further object of the present invention to propose an improved sound-damping and vibration-damping fastening element for elevator guide rails which can be produced more economically, satisfies safety requirements in the case of fire and can also absorb tension forces.

A further object of the present invention consists in proposing a mounting method of a sound-damping and/or vibration-damping fastening element for elevator guide rails, wherein it is made possible to derive a precise matching to the frequencies to be absorbed and wherein the insulation is readily and precisely adapted to the frequencies to be absorbed.

According to the present invention these objects are fulfilled, for the fastening element stated in the introduction, and for the mounting method stated in the introduction.

The fastening element according to the present invention is a sound-damping and/or vibration-damping fastening element for elevator guide rails, consisting of an anchor rail connected by means of a damping medium with a support rail, in which the anchor rail intended to support the elevator guide rail is arranged to be embedded in the damping medium and to extend parallel to the longitudinal extent of the support rail. The longitudinal extent runs substantially parallel to the travel direction of the car in the shaft. The anchor rail and support rail are spaced apart by at least one slot and this slot is filled by the damping medium.

The damping medium is a material which is characterized by a substantially higher coefficient of damping for sound and/or vibrations than that of steel or aluminum.

A slot is the space which is included between two mutually opposite L-shaped profiles (see FIG. 2).

The advantage of the present invention consists in that the anchor rail insulated in terms of vibration relative to the support rail can be loaded in all directions. This is managed by the slot, which is filled with damping medium, between anchor rail and support rail. A component failure can be entirely excluded by a damped abutment or safety bolts. Then only definable maximum shear forces can still arise, which thus cannot cause detaching of the rubber or damping medium lying between the support rail and the anchor rail. Forces in "x", "y" and "z", directions as well as torsional moments, can be appropriately absorbed and damped, i.e., referred to the profile cross-section, in longitudinal axis ("z" axis) as well as transversely in two axes ("x" and "y" axes).

A further advantage of the present invention is that the entire unit can be integrated not only on or at a component, but also in a component.

It is advantageous that materials which can be vulcanized as well as also cast can be used as a rubber or a damping medium.

Moreover, it is advantageous that the most diverse fastening possibilities with threads of the most diverse sizes and even pin holes, etc., are possible.

It is also advantageous that the fastening element is so produced that this is cut according to requirements from a long bar produced as goods by the meter.

Further, it is advantageous if the fastening element is so cut and mounted that its length is tuned to a frequency to be absorbed.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 2:
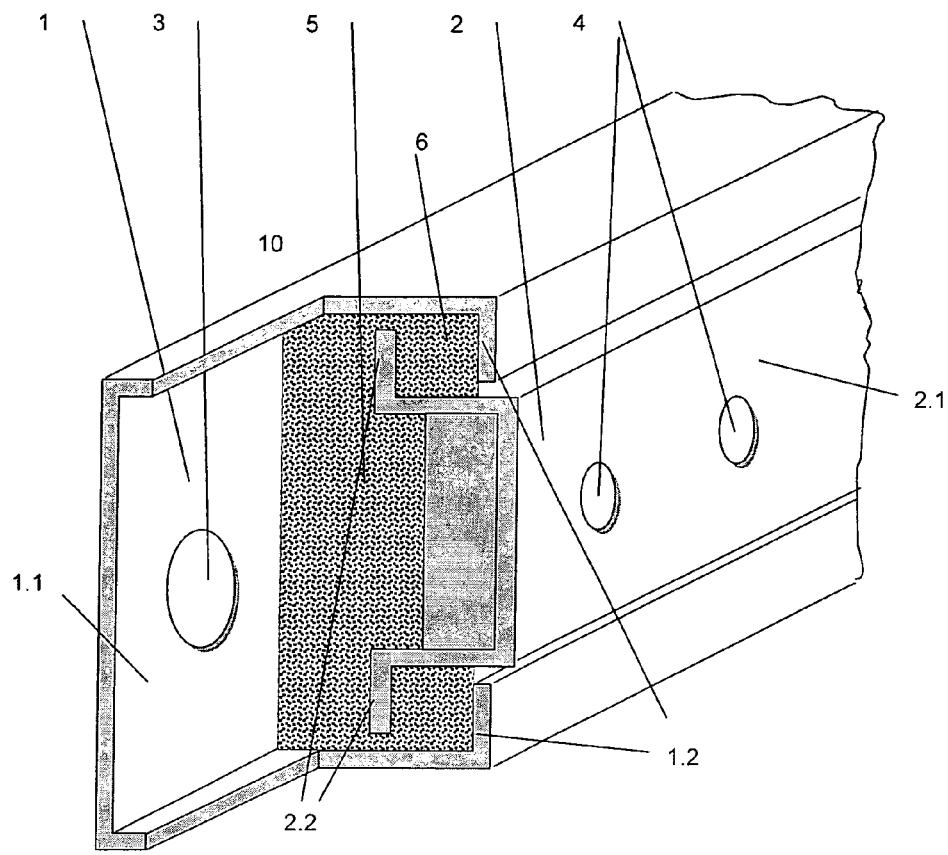
FIG. 2 is a side elevation view of the fastening element for elevator guide rails according to the present invention.

Like constructional elements or construction elements acting in like manner are provided in all figures with the same reference numerals even when they are not realized identically in details.

Figure 1:
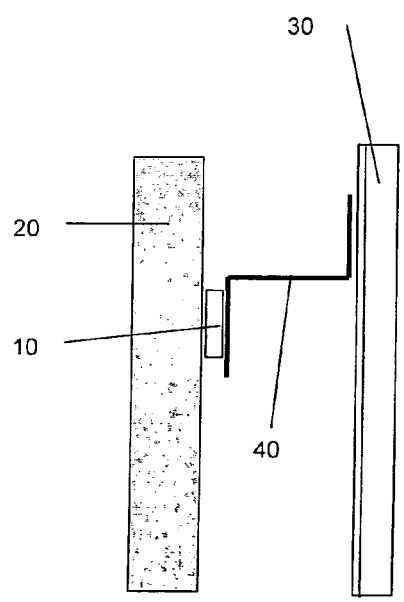
FIG. 1 is a schematic fragmentary perspective view of an elevator guide fastening according to the present invention.

FIG. 1 shows an overall guide rail system and FIG. 2 shows a fastening element 10 according to the present invention. An elevator guide rail 30 is fastened by a fastening bracket 40 to an elevator shaft wall 20. The fastening element 10 is inserted between shaft wall 20 and the fastening bracket 40 in order to damp sound and vibrations.

A support rail 1 consists of a base plate 1.1 and two L-shaped profiles 1.2. The support rail 1 is filled with a damping medium 5 which preferably consists of a castable synthetic material of elastomer or caoutchouc. An anchor rail 2 extending parallel to the support rail 1 is partially embedded in the damping medium 5. The anchor rail 2 also consists of a base plate 2.1 and two L-shaped profiles 2.2, wherein the L-shaped profiles 1.2, 2.2 of the support rail 1 and the anchor rail 2 respectively are disposed opposite one another and the support rail 1 is filled with the damping medium 5. The damping medium 5 can completely fill the support rail 1, but possibly also be provided with cavities. A mechanically positive connection between the support rail 1 and the anchor rail 2 arises by virtue of the L-shaped profiles. As shown in FIG. 1, the anchor profiles 2.2 each have a first portion extending transverse to a plane of the anchor base plate 2.1 and a second portion, the second portions extending away from one another and being embedded in the damping medium 5. The support profiles 1.2 each have a first portion extending transverse to a plane of the support base plate 1.1 and a second portion, the second portions extending toward one another and forming a gap with a width sufficient to expose the anchor base plate 2 and being less than a distance between free edges of the second portions of the anchor profiles 2.2.

The space included between the two opposite L-shaped profiles 1.2 and 2.2 forms a slot 6 (see FIG. 1).

This slot is so dimensioned that vibrations at the guide rails 30 cannot be transmitted to the shaft wall 20.

In the case of destruction of the damping medium 5, for example in the case of a fire, the guide rails 30 fixedly screw-connected with the anchor rail 2 and the fastening bracket 40 can change their position only insubstantially due to the small play of the anchor rail 2 in the support rail 1, so that their function is not prejudiced.

The support rail 1 is typically provided with fastening holes 3 that are sized to receive up to M16 tie bolts. The anchor rail 2 is formed with several threaded holes 4 sized to receive up to M12 bolts for reception of the guide fastenings that are to be insulated.

The damping medium 5, for example rubber which is vulcanized on, is provided between these two profile members 1 and 2, which consist of pressed or rolled steel sections or folded sheet metal sections. The shape of the two profile members 1 and 2 is so selected that in principle a shape-locking connection is present and the slot 6 arises. The spacing between the two profile members 1 and 2 in the unloaded state amounts to approximately three to five millimeters and varies due to the loading which can be produced by the guide shoe pressures and the building subsidence (penetration forces). In the case of overloading, a sound bridge can in practice arise, which thus in principle causes a change in acoustic behavior. This can be evaluated as an indicator for a change in the conditions in general, for example, building contraction, which can possibly be evaluated. An optimum insulation can be adapted to the forces, which are to be absorbed, by way of the overall length of the unit.

The fastening element 10 can advantageously be produced as piece goods or rod material and then cut to length depending on the respective requirement and thus specifically adapted to requirements: the shorter the length, the softer or more absorbing; the longer the length, the stiffer or harder. Manufacture is thus economic.

An exact matching to the frequencies which are to be absorbed can be derived by way of the length or, however, also by way of the number of fastening elements 10. The insulation can be readily and precisely adapted to the frequencies to be absorbed.

The longitudinal extent is defined as parallel to the travel direction of the elevator car. The lateral extent is defined as perpendicular to the travel direction of the elevator car.

Depending on the respective use, lengths of 250 to 500 millimeters are provided. The longitudinal extent is substantially greater than the lateral extent. Proposed as thickness of the complete unit are 45 to 55 millimeters so that the surface pressure "p" does not fall below or exceed the ideal values of $0.25<p<0.40$ N/mm. The hardness of the damping elements shall lie in the range of 50 to 70 Sh A so that the resilient deflection intrinsic to the system cannot exceed the value of three millimeters.

The disturbing frequencies to be absorbed are basically measured. The following components have influence on the system and the excitation frequencies (at VKN=1.0 m/s) thereof are partly known:

| Components | Excitation Frequency $f_{err}$ [min$^{-1}$] |
|---|---|
| Hoist motor (1000, 1500 and 1950 rpm at VKN = 1.00 m/a) | 990, 1290/1309, 1850 |
| Screw shaft (tooth frequency translation ratio) | 2970, 2580/2618, 5550 |
| Drive pulley diameter 320 mm | 60 |
| Support cable diameter 8 mm | 26112 |
| Speed limiter (GBPD), cable pulley diameter 200 mm | 95 |
| Speed limiter (GBPD), limiter rocker (8 cams) | 764 |
| Limiter cable | 14688 |

The geometry and hardness of the damping elements are determined by vibration or force measurements in "x", "y" and "z" directions. In addition, the unit can be simulated by an FEM analysis.

As rule-of-thumb there applies: insulating range greater than or equal to $\sqrt{2}$ times the excitation frequency (thumbrule). The natural frequency of the damping element should amount to at least 40% of the interference frequency.

The natural frequency $f_e$ can be calculated by, for example, the following approximation formula:

$$f_e = \tfrac{1}{2}\Pi^* \sqrt{(C/m)},$$

wherein "m" represents the mass of the guide rail lying between two successive fastening points and "C" represents the linear stiffness of the fastening elements.

The length of the fastening element 10 in order to damp a specific excitation frequency can thus be uniquely determined.

The length of the fastening elements 10 can be realized by, for example, one working step or cut. The connections at both sides (interface with respect to structure=building substance) are always formed to be the same.

Production can be carried out with drawn or, however, also with folded basic sections. However, it is also possible to operate with punched or laser-cut and then folded small parts.

It is also possible to use standard sections, which then, however, have to be reprocessed by machine.

The fastening element 10 can be created and processed by the simplest means. There is no need for expensive, preshaped insulators. Commercially available usual rectangular profile members are entirely sufficient.

According to a cost-saving preferred form of the embodiment the damping medium consists of a castable synthetic material.

The advantages achieved by the present invention reside on the one hand in the security of the fastening of the components in the case of fire or due to heat action and on the other hand in the economic manufacture. The proposed castable synthetic material of elastomer/caoutchouc, for example polyurethane, bonds well with sand-blasted steel, is oil-resistant, ozone-resistant and more resistant to aging than the known fastening elements equipped with vulcanized rubber dampers. Moreover, it is also possible to realize different degrees of hardness depending on the respective requirement.

In addition, other suitable, more economic materials can be used as damping medium.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An elevator installation with a guide rail fastened to a wall by a sound-damping and/or vibration-damping fastening element comprising:

an elevator guide rail positioned adjacent to a wall in an elevator installation;

an anchor rail including a longitudinally extending anchor base plate and a pair of generally L-shaped anchor profiles extending from said anchor base plate, said anchor rail being coupled to said elevator guide rail;

a support rail including a support base plate extending generally parallel to a longitudinal extent of said anchor base plate and a pair of generally L-shaped support profiles extending from said support base plate, said support rail being attached to the wall; and a damping medium attaching said anchor rail and said support rail together, said anchor rail being at least partially embedded in said damping medium, said anchor profiles and said support profiles being spaced apart by at least one slot filled by said damping medium whereby the fastening element provides sound-damping and/or vibration damping between the wall and said elevator guide rail.

2. The fastening element according to claim 1 including at least one fastening hole formed in said support base plate.

3. The fastening element according to claim 1 including at least one hole formed in said anchor base plate for attaching said anchor rail to the elevator guide rail.

4. The fastening element according to claim 1 including a bracket fastened to said anchor rail for attaching said anchor rail to the elevator guide rail.

5. The fastening element according to claim 1 wherein the fastening element is formed with a length tuned to a sound or vibration frequency to be absorbed.

6. The fastening element according to claim 1 wherein said anchor profiles each have a first portion extending transverse to a plane of said anchor base plate and a second portion, said second portions extending away from one another and being embedded in said damping medium.

7. The fastening element according to claim 6 wherein said support profiles each have a first portion extending transverse to a plane of said support base plate and a second portion, said second portions extending toward one another and forming a gap with a width sufficient to expose said anchor base plate and being less than a distance between free edges of said anchor profile second portions.

8. A method of manufacturing a sound-damping and/or vibration-damping fastening element for elevator guide rails fastened to a wall in an elevator installation comprising the steps of:

a) providing an anchor rail including a longitudinally extending anchor base plate and a pair of generally L-shaped anchor profiles extending from said anchor base plate;

b) providing a support rail including a support base plate extending generally parallel to a longitudinal extent of said anchor base plate and a pair of generally L-shaped support profiles extending from said support base plate;

c) connecting the anchor rail and the support rail together with a damping medium by at least partially embedding the anchor rail in the damping medium, the anchor rail extending parallel to a longitudinal extent of the support rail to form a long bar, and the anchor profiles and the support profiles being spaced apart by at least one slot filled by the damping medium; and d) cutting the fastening element to a predetermined length from the long bar and coupling the fastening element between the wall and one of the guide rails whereby the fastening element provides sound-damping and/or vibration damping between the wall and the one of the guide rails.

9. The method according to claim 8 including a step of selecting the predetermined length to be tuned to a sound or vibration frequency to be absorbed.

10. A method of mounting a sound-damping and/or vibration-damping fastening element for elevator guide rails fastened to a wall in an elevator installation comprising the steps of:

a) providing an anchor rail including a longitudinally extending anchor base plate and a pair of generally L-shaped anchor profiles extending from said anchor base plate with at least one hole for attaching the anchor rail to an elevator guide rail;
b) providing a support rail including a support base plate extending generally parallel to a longitudinal extent of said anchor base plate and a pair of generally L-shaped support profiles extending from said support base plate with at least one fastening hole for attaching the support rail to an elevator shaft wall; and
c) connecting the support rail to the anchor rail with a damping medium with the anchor rail being at least partially embedded in the damping medium and extending parallel to a longitudinal extent of the support rail, the anchor profiles and the support profiles being spaced apart by at least one slot filled by the damping medium and coupling the fastening element between the wall and one of the guide rails whereby the fastening element provides sound-damping and/or vibration damping between the wall and the one of the guide rails.

11. The method according to claim 10 including a step of forming the fastening element with a length tuned to a sound or vibration frequency to be absorbed.

12. The method according to claim 10 including providing at least one bracket attached to the anchor rail for fastening to the elevator guide rail.

* * * * *